STEP VOLTAGE GENERATOR

Filed May 25, 1966

INVENTOR
Otmar Ringelhaan
BY [signature]
ATTYS.

Jan. 7, 1969 O. RINGELHAAN 3,421,020

STEP VOLTAGE GENERATOR

Filed May 25, 1966

INVENTOR
Otmar Ringelhaan

BY Stiee & Stiee

ATTYS.

United States Patent Office 3,421,020

Patented Jan. 7, 1969

3,421,020

STEP VOLTAGE GENERATOR

Otmar Ringelhaan, Munich-Neuaubing, Germany, assignor to Siemens Aktiengesellschaft, a corporation of Germany Filed May 25, 1966, Ser. No. 552,886

Claims priority, application Germany, May 28, 1965, S 97,357

U.S. Cl. 307—227 15 Claims

Int. Cl. H03k 6/06; 4/02

ABSTRACT OF THE DISCLOSURE

A step voltage generator for converting an analogue signal into step signals and which is symmetrical and can be constructed with one-way switches.

This invention relates to a step voltage generator for apparatus and devices in the electrical communications, measuring and data-processing technology.

In the coding of analogue signals, for example, in numerous cases of utilization, it is desired for precision or reliability which may be sought in the operation of the coder, if not absolutely necessary therefor, to present the analogue signal in the form of a step signal which is stepped in rhythm with the scanning frequency. For the transformation of an analogue signal into such a step signal, a step voltage generator is employed. One such step voltage generator may consist primarily of a storage system to which the signal to be transformed is supplied over a circuit switching device controlled in rhythm with the signal scanning frequency. The switching device must be biased or actuated in such a way that it discharges the storer of the storage system, with each pulse of the beat controlling it, to produce an output signal having a constant value between biasing pulses corresponding to the momentary value of the signal present at the input of the storage system. Since the sequence or frequency of the beat pulse must be greater than the analogue signal in order to fulfill scanning requirements, with relatively high band widths of the signal to be transformed, very high demands must sometimes be placed on the switching speed of the switching device of such a step voltage generator. In step voltage generators for very broad signal bands, the difficulties encountered for the realization of such a switching device are extremely high. One of the primary reasons that such difficulties are encountered is that the charging of the storage system which is to be carried out in rhythm with the signal scanning frequency requires a two-way switch. If such a switching device is to be constructed with semiconductor structural parts suited especially for rapid switching operations, it is usually necessary that a semiconductor arrangement with at least two blocking layers be employed. Such a semiconductor arrangement has a considerably lower frequency limit than one with only one blocking layer, for example a usual type semiconductor diode, and, therefore, with increasing switching frequencies, it gives rise to disturbances. Also it has a pronounced drawback that the influence of stray reactances on the circuit by the two blocking layer devices cannot be easily compensated for in a practical manner.

The invention has as one of its underlying objectives, for a step voltage generator of the type described in the introduction, especially for the transformation of very wide-band analogue signals into step signals, that of overcoming the difficulties described above in a simple manner.

Proceeding from a known step voltage generator for apparatuses and devices of the electrical communications, measuring and data-processing technology, consisting essentially of a storage system on the input of which, over a switching device, there is connected an electric signal whose momentary values are supplied in rhythm with a beat pulse controlling the switching arrangement and in which the output of the storage arrangement is connected to the output proper over an impedance transformer, this problem is solved according to the present invention by forming the storage arrangement with two storers and the switching arrangement with two one-way switches which are assembled symmetrically with respect to the symmetrical input signal and that, further, each storer is connected with a source serving for its discharging or recharging between successive beat biasing pulses, and that the impedance device connected to the output of the storage arrangement is a differential amplifier constructed, at least on input side thereof, likewise symmetrically.

Underlying the invention is the essential principle that a step voltage generator with symmetrical structure can be realized with one-way switches, which achieve at high frequencies, considerably better properties, if the discharge, in this case necessary in the time intervals between two successive switchings with respect to their influences disturbing the desired step form of the signal, are eliminated in a differential amplifier connected to the outlet of the storage arrangement.

The symmetrical design of the step voltage generator according to the invention has the advantage that the beat source delivering the beat biasing pulse for the one-way switch can be arranged unsymmetrically. Here it is connected with its one terminal to a symmetrizing member or circuit for the input signal, which symmetrizing member has a pair of terminals in connection with the terminals of the signal source and with the signal-input-side terminals of the one-way switches.

Also, the symmetrical design proposed by the invention provides the possibility of allowing further elements in combination with the switching arrangement for compensating the interfering influence of the blocking impedances of the one-way switches. These consist very suitably of two capacitors connecting the one-way switches crosswise and dimensioned in a suitable manner.

Expediently, the one-way switches are formed of semiconductor diodes.

In a preferred example of execution of the present invention the symmetrical input signal is connected through, in each case, like one-way switches poled in the same direction and with the symmetrical input of the storage system consisting of the series circuit of two like capacitive storers. Like current sources serving for the discharging of the storers are connected in each case parallel to the storers. Moreover, the symmetrical input of the differential amplifier is constructed extremely high-ohmic.

The symmetrizing member to which the unsymmetrically arranged beat pulse source is connected with its one terminal may be formed expediently of a coil with a middle tap for the connection of the beat pulse source in series with a pair of resistors at each connecting end thereof. The inductance of the coil is dimensioned logically for the utilization of the principle of resonant transmission in a suitable manner.

The relations take on an especially favorable form if the coil with middle tap is a wide-band transformer, preferably a ring core transformer with high inductance of its own, parallel to which is connected a coil or inductor preferably adjustably constructed and determining essentially the total inductance of the system.

The current sources connected in parallel to the storers can in a simple manner be formed of a transistor in common base circuit which is connected to a suitable operating direct current, and in whose emitter feed there is provided a relatively large resistance.

The extremely high-ohmic symmetric input of the differential amplifier is expediently formed of two transistors in common collector circuit with relatively large dimensioned resistances in the emitter feed line.

The storers of the storage device may be formed very suitably by, in each case, a capacitor.

In order to keep the load of the storers as small as possible in the time interval between two successive switchings, it is recommended that the current sources formed by transistors in common base circuit be connected with respective ones of the transistors on input side of the differential amplifier in common collector circuit on emitter side of each by a resistor presenting a positive feedback which is dimensioned in such a way that the finite input resistance of the current sources and also the finite input resistance of the differential amplifier becomes relatively small i.e., the external load of the storer becomes zero.

Another advantageous circuit variant for maintaining the external load of the storer small consists in an arrangement whereby the storers, together with the current sources allocated to them are executed as a so-called "bootstrap circuit" whereby each of the storers consisting of a capacitor is connected with the current source allocated to it over a suitably dimensioned resistor and that, further, at the common connecting point of the storage capacitors there is connected with this resistor the base of a transistor in common collector circuit and to this resistor in series with the emitter-base junction of said transistor there is connected in parallel a Zener diode poled in blocking direction with respect to the current source. The two transistors present simultaneously the symmetrical input of the differential amplifier.

In another advantageous example of execution of the invention, in the two connecting paths between the symmetrical input signal and the symmetrical, extremely low-ohmic input of the differential amplifier, there is inserted in each case the series circuit of an inductive-like storer and a voltage source serving for its discharging or recharging. In parallel to the symmetrical input signal the opposite-poled series circuit of the two equal one-way switches consisting preferably of semi-conductor diodes is connected.

The two inductive storers are very suitably formed by, in each case, an inductance.

In another preferred example of execution according to the invention, in which to the input of the step voltage generator there is connected on input side a symmetrical input amplifier for the signal to be re-formed and in which the differential amplifier engaged on outlet side of the storage device is constructed symmetrically also on output side, the individual stages of the input amplifier and of the differential amplifier consist in each case of two transistors connected to one another, of which at least the operating points of the transistors of the output-side stages are dimensioned for the point of maximal loss performance on the given load line.

Extremely great advantages are offered by the use of the invention in an analogue-digital converter operating according to the principle of time-stepped coding for apparatuses and installation of electrical communications technology for the transmission of especially very wide-band signals. Such an analogue-digital converter consists here of a number of partial coders, which comprise, on the one hand, a decider with evaluator and, on the other hand, a network making possible the time-stepping for balancing the decider time, possibly in common to two and more deciders, which network is here realized through the teachings of the invention.

With the aid of examples of construction illustrated in the drawing, the invention will be explained in greater detail in the following.

In the drawings, in which like reference characters indicate like or corresponding parts:

FIG. 1 is the schematic circuit diagram of a preferred embodiment of the invention;

FIGS. 2*a*–2*f* are time-voltage diagrams showing the voltages occurring at the various points of the circuit according to FIG. 1;

Figure 1:
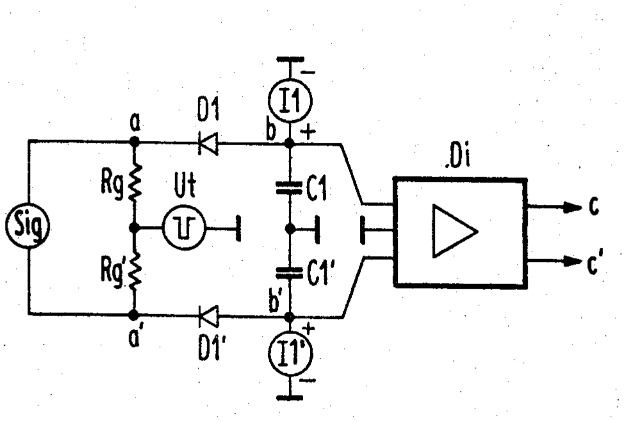
Figure 2:
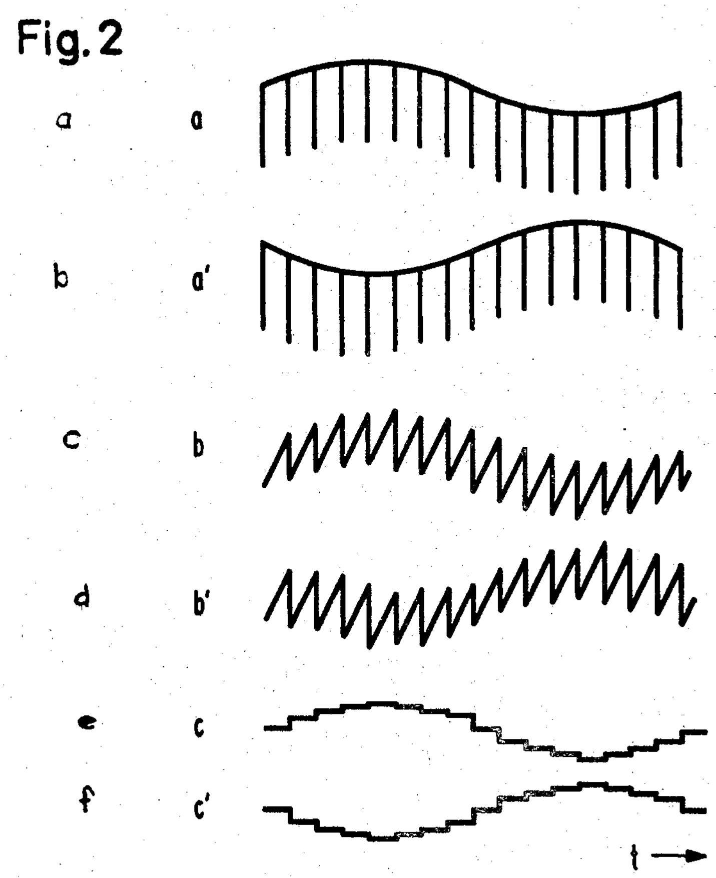

The embodiment of the invention, schematically illustrated in FIG. 1, of a step voltage generator according to the invention employs two capacitors C1 and C1′ representing the storage arrangement, which are connected in series with one another and are connected to a reference potential at their common connecting point. The circuit further comprises two semiconductor diodes D1 and D1′ which are connected between respective opposite sides of capacitors C1 and C1′ and respective opposite sides of a signal source S*ig* and are identically poled with respect to the terminals of the signal source S*ig*. Connected in parallel with the signal source S*ig* is a further series circuit of two resistors R*g* and R*g*′, to the common connecting point of which there is connected one terminal of a beat pulse source U*t* for controlling the conduction of the diodes D1 and D1′. The other terminal of the beat pulse source is connected to the reference potential. The resistances R*g* and R*g*′ are of like construction and form a symmetrizing circuit for the signal source S*ig*. Connected in parallel to each of the capacitors C1 and C1′ is a current source I1 and I1′, respectively, which perform to discharge the capacitors C1 and C1′ in the time intervals between successive pulses of the beat pulse source U*t*. The output of the step voltage generator according to FIG. 1 is formed of a symmetrically constructed differential amplifier D*i*, which is connected in parallel at its very high resistance symmetrical input with the series circuit of the two capacitors C1 and C1′.

For a better understanding of the operation of the circuit illustrated in FIGURE 1, there is represented, in FIGS. 2*a*–2*f* a series of time-voltage diagrams, showing the voltages occurring at various points of the circuit according to FIG. 1. Each voltage diagram is designated with letters which correspond to those in the circuit of FIG. 1 and indicate in each case the circuit point at which the voltage thus designated occurs relative to the reference potential. In the rest state of the source U*t* the two diodes D1 and D1′ are blocked. With each negative pulse of the beat pulse source U*t* the two diodes are switched over to a conducting state and through them the capacitors C1 and C1′ are charged to the total of the momentary value present at that point of time of the symmetrical signal source S*ig* and of the pulse in question of the source U*t*. In the diagrams of FIG. 2 there is assumed that the signal voltage has a sine form. As the two top diagrams *a* and *a*′ illustrate, the beat pulses are superimposed on the respective signal voltages at the two diodes D1 and D1′, and are symmetrical with respect to one another, namely, in the same direction at both sides. These like pulses, superimposed on the signal voltages symmetrically with respect to one another produce at the capacitors C1 and C1′ a sawtooth voltage wave form, as the current sources I1 and I1′, connected in parallel with such capacitors, linearly discharge the same in the time intervals between two successive beat pulses. The corresponding sawtooth diagrams are presented in FIGS. 2*c* and 2*d* and identified with the letters *b* and *b*′. The sawtooth formation is eliminated in the differential amplifier D*i*, so that at its outputs *c* and *c'* which likewise are symmetrical to one another, there appears, in rhythm with the sequence frequency of the beat pulse source U*t*, the input signal re-formed into a step signal.

The basic concept of the present invention, that of deriving the desired step voltage from a sawtooth voltage, thus makes it possible in each of the two branches of the circuit conducting the signal voltage to be reshaped, to utilize a unipolar circuit element, and as a result thereof to produce a step voltage generator achieving considerably higher values of switching speed and precision. The symmetrical construction of the circuit of the invention, as already mentioned, has the advantage that the disturbing influence of the diode capacitances with respect to the re-forming of the signal can be compensated in a simple manner. The voltage which passes over the diode capacitances to the capacitors C1 and C1' and there falls off creates a distortion of the horizontal level of the steps of the desired step-shaped signal. The compensation of these diode capacitances can be effected with the aid of two capacitors, having corresponding dimensioning, diagonally connecting the two diodes to produce the counterphase required for the neutralization of the diode capacitances automatically as a result of the symmetry of the arrangement. An impairment of the level of the individual portions of the step signal generated in the manner according to the invention can only result if the external load of the two capacitors C1 and C1' is not kept sufficiently small in the time intervals between successive beat pulses. An exact transformation of the input signal into a step signal further presupposes that the capacitors C1 and C1' are briefly charged to the full momentry value of the input signal during the duration of a beat pulse.

Figure 3:
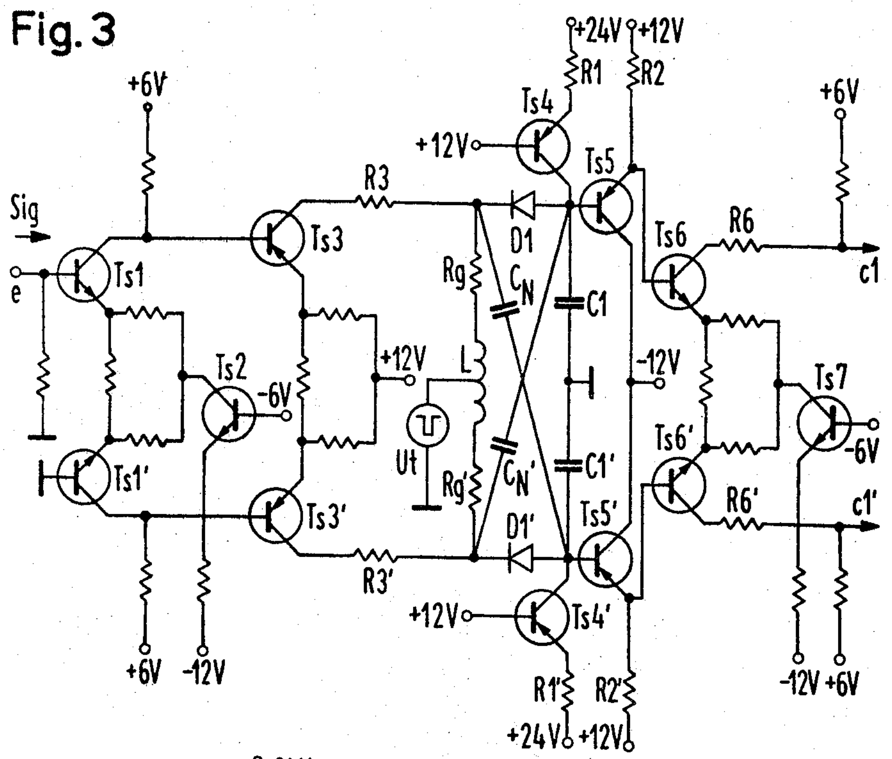
FIG. 3 is a detailed circuit diagram of an example of construction according to the invention, corresponding to the scheme represented in FIG. 1.

FIG. 3 illustartes a circuit for a step voltage generator according to the invention which fulfills all these requirements to a high degree, utilizing the circuit principles represented schematically in FIG. 1. In this embodiment the diodes D1 and D1' are diagonally connected by capacitors $C_N$ and $C_N'$, which are so dimensioned that they neutralize the influence of the diode capacitances on the voltages of the two capacitors C1 and C1'. The symmetry member in FIG. 1 consisting of the two resistors R*g* and R*g'* is supplemented in the example of construction according to FIG. 3 by a coil L, at the center tap of which there is connected one terminal of the beat pulse source U*t*, while the resistors referred to connect the end terminals of the coil L with the diodes D1 and D1', respectively. The coil L, together with the capacitors C1 and C1' form a resonant system which is so dimensioned that the capacitors C1 and C1' are charged at the occurrence of each beat pulse of the source U*t*, at the highest speed, to the full momentary value of the signal voltage. Expediently, the coil L, as has already been stated, is formed of a ring core transformer with high inherent inductance and an adjustable coil with considerably lower inductance connected in parallel therewith. Here the ring core transformer serves for the realization of a precise middle tapping and the adjustable coil serves for the establishment of the desired inductance value for the resonant system.

The current sources I1 and I1' according to FIG. 1 are formed in FIG. 3 by transistors T*s*4 and T*s*4' operating in common base circuit, which at their emitter side are connected over sufficiently high resistors R1 and R1' respectively, of sufficiently high resistance with an operating voltage, in this case of +24 v. The extremely high resistance input of the differential amplifier is formed by two transistors T*s*5 and T*s*5' operating in common collector circuit, which have their respective bases connected to the connecting points of each of the capacitors C1 and C1' with each of the diodes D1 and D1', respectively, and the collector of the transistors T*s*4 and T*s*4', respectively, and, on emitter side, through resistors R2 and R2' to a positive operating voltage of +12 v. With this circuit the external load for the capacitors C1 and C1' has a resistance of greater than 500 KΩ.

In the example of the invention according to FIG. 3 there is connected at the input of the step voltage generator proper an amplifier whose first stage, consisting essentially of a pair of transistors T*s*1 and T*s*1', serves for the symmetrizing of the unsymmetrical signal S*ig* connected to the control input *e* of the transistor T*s*1. The second stage, following this input stage and including a pair of transistors T*s*3 and T*s*3', is connected with the actual input of the step voltage generator. In like manner, the second stage including a pair of transistors T*s*6 and T*s*6' of the differential amplifier feeds over a pair of collector connected resistors R6 and R6' to the load connected at the symmetrical output *c*1 and *c*1'. The transistor T*s*7 has the collector thereof connected through a resistance network to the emitters of the transistors T*s*6 and T*s*6'. The transistor T*s*2 likewise has the collector thereof connected through a resistance network to the emitters of the transistors T*s*1 and T*s*1'. The transistors T*s*2 and T*s*7 provide in phase cancellation for both the input and the output signals.

The input amplifier as well as the differential amplifier must, as can be seen from FIG. 3 be formed as direct current amplifiers. For the exact reshaping of the input analogue signal into a step signal it is of importance that the zero-point drift in the direct voltage amplifiers, which is mostly caused by temperature fluctuations, be suppressed. Especially in transistor amplifiers the cause of the zero-point drift lies in the temperature-dependence of the base-emitter threshold voltage, which is added to the input voltage. In symmetrical amplifiers the external temperature effects can be easily eliminated. Temperature differences appearing in the two branches of a symmetrical amplifier that are caused by level control, however, may also occur and cause drift. With level control, there arises in both branches, in general, different loss performances and, as a consequence of this, different blocking layer temperatures. By maintaining a relatively close thermal coupling as possible of the respective transistors, this influence can be kept small, but because of the unavoidable time constant of this coupling, complete temperature equality can never be attained.

The complete suppression of the temperature-dependent zero-point drift is, however, possible in an extremely advantageous manner if the working point of the amplifier is placed on the point of maximal loss performance, i.e., in the center of the load line. This dimensioning is based on the important consideration of producing in both branches of a symmetrical amplifier, independently of the control level, equal loss performances and thereby equal temperature conditions. In such a situation, the load line touches the performance curve hyperbola of the transistor. Control from this point then always goes into an area of lower loss performance, regardless of whether the controlling is done in the one or in the other direction. Since in each case with equal control in both directions the loss performance drop is also quantitatively equal, in this case also, there occurs no temperature difference in the two branches of a symmetrical amplifier and, consequently no drift will result.

In many cases an optimal dimensioning in this respect is not directly possible. In wide-band amplifiers, for example, the load resistance required is often prescribed. Also, the operating voltages and currents will not always be freely choosable. In the example of execution represented in FIG. 3 this holds for the signal input amplifier as well as for the differential amplifier on the output. The principle of equal loss performance is taken into account in the output amplifier stages of the input amplifier as well as of the differential amplifier by the use of additional load resistances R3 and R3' provided in the collector feed line of the transistors T*s*3 and T*s*3' or, respectively, load resistors R6 and R6′ in the collector feed line of the transistors Ts6 and Ts6′. These resistors can, if need be, be bridged by condensers so that the wide-band properties of the amplifier are preserved.

Figure 4:
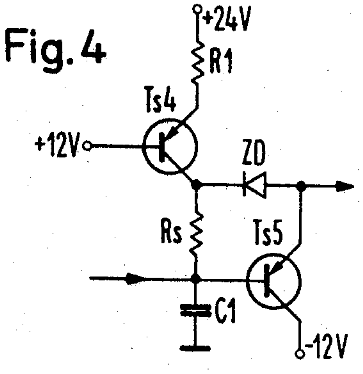
FIG. 4 is a first circuit variant of the storer output side according to FIG. 3.

The circuit variant represented in FIG. 4 shows a further possibility for keeping the external load of the capacitor C1 or C1′ very small. Because of the symmetry of the arrangement, in FIG. 4 only the circuit relating to the capacitor C1 is represented. A corresponding situation holds for capacitor C1′. In agreement with FIG. 3, the current source is in FIG. 4 formed by the transistor Ts4 in common collector circuit, which is connected by its emitter through the resistor R1 to the operating direct voltage. In like manner the transistor Ts5, on the side of capacitor C1, forming the input of the differential amplifier is connected in a common collector circuit. In contradistinction to FIG. 3, however, the transistor Ts5 now receives its current over the transistor Ts4 and a Zener diode Zd is connected between the collector of the transistor Ts4 and the emitter of the transistor Ts5, said Zener diode being poled in blocking direction. Moreover, the transistor Ts4 is now connected by its collector through the resistor Rs to the common connecting point of the capacitor C1 and the base of the transistor Ts5. The Zener diode Zd acts in this circuit as a source of constant voltage. Thereby, in consequence of the negligible voltage drop occurring between base and emitter of transistor Ts5, there is produced a constant voltage drop at the resistor Rs—i.e., the current charging the capacitor C1, flowing through the resistor Rs, is constant. The switching circuit variant according to FIG. 4 represents, in other words, a "bootstrap" circuit in which the capacitor C1 exercises the function of the charging capacitor. The input resistance of the differential amplifier can in this way be raised to 1 MΩ.

Figure 5:
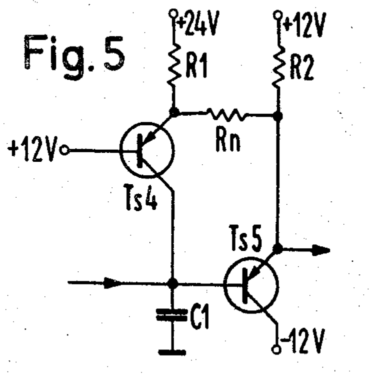
FIG. 5 is a second circuit variant of the storer output side according to FIG. 3.

Another circuit variant keeping the external load of the capacitor C1 or C1′ very small is represented in correspondence to FIG. 4 in FIG. 5. It differs from the corresponding circuit parts of FIG. 3 merely in that the emitter of the transistor Ts4 for the current source and the input transistor Ts5 for the differential amplifier are connected by a resistor Rn which produces a positive feedback. Through suitable dimensioning of this resistor Rn the finite internal resistance of the current source and also the finite input resistance of the differential amplifier can be reduced to a negligible amount, i.e. the external load of the capacitor C1 approaches zero.

Figure 6:
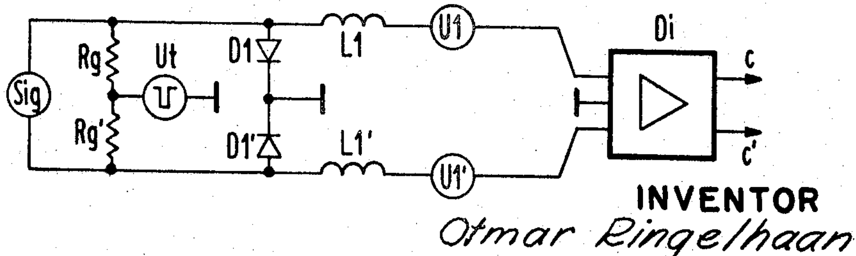
FIG. 6 is the schematic representation of another example of construction according to the invention.

In the further example of execution represented in FIG. 6 according to the invention, the two terminals of the symmetrical signal source Sig are connected with an extremely low-ohmic symmetrical input of the differential amplifier Di, in each case over a series circuit of an inductance L1 and a voltage source U1 or an inductance L1′ and a voltage source U1′. According to FIG. 1, here, too the unsymmetrical beat pulse source Ut is connected over the common connecting point of the two resistors Rg and Rg′ connected in series, which are here active as a symmetrizing member between the signal source Sig and the one-way switch consisting of the diodes D1 and D1′ on the side of the terminals of the signal source Sig. In contrast to FIG. 1, the two diodes D1 and D1′ are connected in series to one another and oppositely poled and the series arrangement is connected in parallel to the signal source.

The example of execution represented in FIG. 6 presents practically the same type of dual switching circuit as that employed in the example of execution according to FIG. 1. Correspondingly, the diodes D1 and D1′ are now conducting in the rest state and are blocked with each pulse emitted from the beat pulse source Ut for the duration of one pulse. During this period, the inductances L1 and L1′ representing the storer are charged with the signal current and in the time intervals between successive pulses are again discharged by the voltage sources U1 and U1′. The in-phase sawtooth wave form is eliminated, in correspondence to FIGS. 1 and 2, in the differential amplifier Di, so that at its two outputs, symmetrical to one another, there occurs the input-side analogue signal transformed into the desired step signal.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

The invention claimed is:

1. A step voltage generator for transforming wide band analogue signals into step signals comprising, a pair of storage circuits with first sides connected together, a pair of switches connected in circuit with the other sides of said storage circuits, a pair of input terminals connected to said switches, the analogue signal connected to the input terminals, a switching generator connected to said pair of switches to control them, a differential amplifier with a pair of input terminals connected respectively to said storage circuits, and a pair of discharge devices connected to said storage devices for discharging them when the switches are not conductive.

2. The step voltage generator as defined in claim 1 including a symmetrizing circuit which has a coil having a center tap connected to said switching generator, and a pair of resistors each connected between a respective opposite end of said coil and a respective side of the input, the inductance value of said coil being dimensioned to produce resonant transmission.

3. The step voltage generator as defined in claim 2 wherein said coil includes a ring core with a relatively high value of inductance and an inductor connected in parallel to said ring core.

4. The step voltage generator as defined in claim 1 including means for compensating interferences caused by said switches.

5. The step voltage generator as defined in claim 4 wherein said compensating means includes a pair of capacitors each connected from an input side of a respective one of said switches to an output side thereof.

6. The step voltage generator as defined in claim 1 wherein each of said switches are unidirectionally conductive and each poled the same with respect to the input.

7. The step voltage generator as defined in claim 1 wherein said swtiches are semiconductor diodes.

8. The step voltage generator as defined in claim 1 wherein said discharging means includes a pair of current sources, each connected in paralled with a respective one of said storage circuits.

9. The step voltage generator as defined in claim 8 wherein each of said current sources includes a first transistor connected in common base circuit with a direct voltage and a resistor of relatively high resistance connected between a source of feed voltage and the emitter of said transistor.

10. The step voltage generator as defined in claim 9 wherein said differential amplifier includes a pair of second transistors having the base electrode of each forming opposite sides of an input thereto, the collector of said first transistors being connected to the base of respective ones of said second transistors and to respective ones of said storage circuits, positive feedback means connecting the emitters of respective ones of said first and second transistors, said feedback means being dimensioned such that the internal resistance of said current sources and the input resistance of said differential amplifier become negligible.

11. The step voltage generator as defined in claim 1 wherein said differential amplifier includes a symmetrical input having a pair of transistors in common collector circuit and a relatively large load resistance.

12. The step voltage generator as defined in claim 1 wherein said storage circuits include capacitors.

13. The step voltage generator as defined in claim 1 including a pair of resistors each connecting said discharging mean with a respective one of said storage circuits, a pair of transistors having the base of each connected between a respective one of said storage circuits and a respective one of said resistors, a pair of Zener diodes each connected in series with a respective one of said resistors across the emitter-base junction of a respective one of said transistors, each of said diodes being poled in blocking direction with respect to the respective current source.

14. The step voltage generator as defined in claim 1 wherein each of said storage circuits includes an inductor, said discharging means includes a pair of voltage sources connected to a respective one of said inductors.

15. The step voltage generator as defined in claim 1 including a symmetrical amplifier connected between the input and said switches, said differential amplifier and said symmetrical amplifier each include a pair of transistors connected in opposition to one another and wherein each transistor is operated at a point on the load line characteristic of each to provide maximum loss conduction.

References Cited

UNITED STATES PATENTS

| | | | |
|---|---|---|---|
| 3,119,071 | 1/1964 | Euler et al. | 328—186 |
| 3,158,757 | 11/1964 | Rywak | 307—88.5 |
| 3,241,078 | 3/1966 | Jones | 307—88.5 X |

JOHN S. HEYMAN, *Primary Examiner.*

U.S. Cl. X.R.

307—228, 229, 230; 330—30